Nov. 4, 1947.  T. McG. AIKEN  2,429,972
ROTARY SHUTTER
Filed Nov. 20, 1944  3 Sheets-Sheet 1
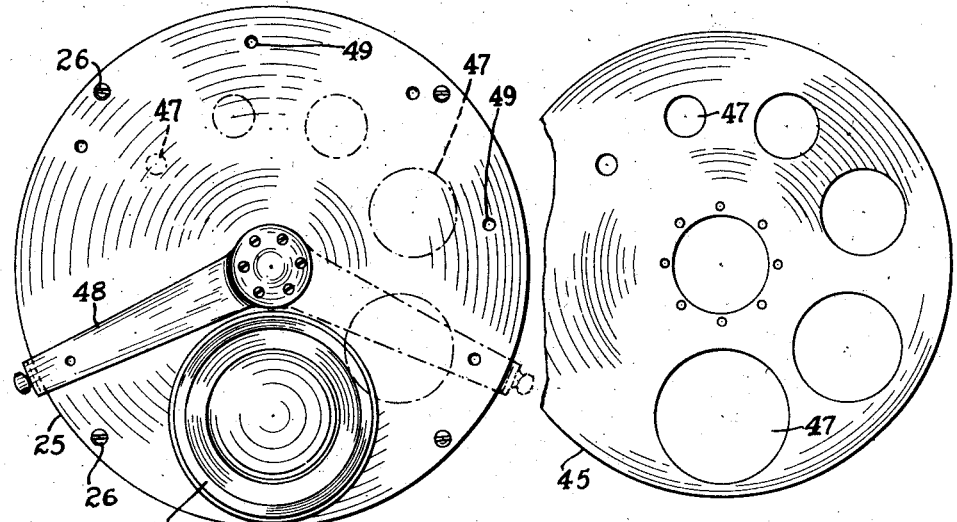
Fig. 5
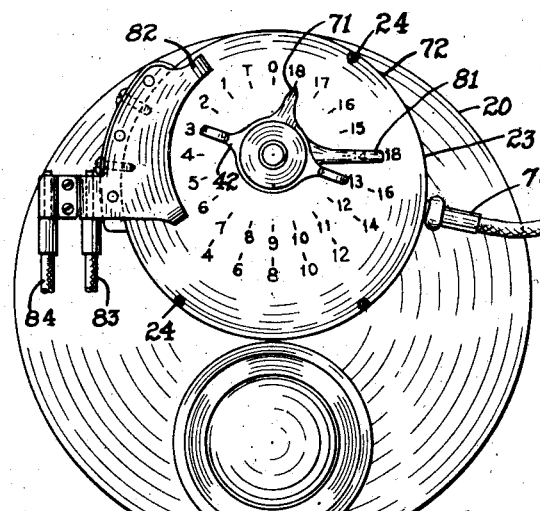
Fig. 1.
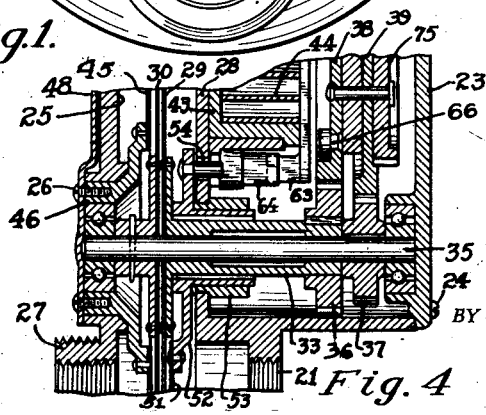
Fig. 4.
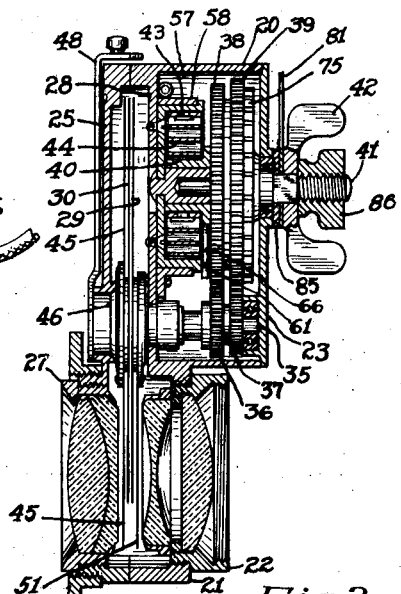
Fig. 3.
Fig. 10.
INVENTOR
Thomas McG. Aiken
Archworth Martin
His ATTORNEY Nov. 4, 1947.                    T. McG. AIKEN                    2,429,972
                                 ROTARY SHUTTER
                  Filed Nov. 20, 1944           3 Sheets-Sheet 2

INVENTOR
Thomas McG. Aiken
BY Archworth Martin
His ATTORNEY

Patented Nov. 4, 1947

2,429,972

UNITED STATES PATENT OFFICE 2,429,972

ROTARY SHUTTER

Thomas McG. Aiken, Pittsburgh, Pa.

Application November 20, 1944, Serial No. 564,195

8 Claims. (Cl. 95—61)

This invention relates more particularly to cameras of the rotary shutter type and constitutes an improvement upon and modification of the structure described in my application Ser. No. 536,663, filed May 22, 1944 (Patent 2,391,377).

One object of my invention is to provide a spring-driven shutter structure of the rotary type so constructed that there will be less moving weight and inertial forces to overcome at the end of an exposure operation, with consequent lessened strain on the parts of the mechanism.

Another object of my invention is to provide shutter apparatus of the construction referred to, wherein a coiled power spring is at its outer end connected to a stationary housing and at its inner end connected to the driven shaft that turns the shutter members, under the influence of the spring.

Another object of my invention is to provide a safety shield or auxiliary shutter in conjunction with spring-driven shutter elements, with means for utilizing the power spring to close the safety shield quickly.

Actual use of a camera embodying my invention, over a period of some months, in the taking of pictures of fast moving objects, has shown that it has a number of important advantages arising out of the fact that it comprises a shutter in the form of two thin discs having exposure openings, and which are spring-driven in the same direction and in such relative relation and different speeds that the openings are brought periodically into registry at the lens, to make exposures. The arrangement is such that, under the influence of a power spring, the shutter discs may be driven a plurality of revolutions, and thus reach a high speed, by the time the openings come into registry for an exposure, with consequent short exposures. The arrangement also permits the gradual dying down or tapering off of this momentum, thus avoiding shocks that would occur with sudden stops.

With the discs turning in the same direction, there is less suctional force or air friction between them, and also the thin discs which I use are in less danger of catching together at their edges, through fluttering, than if they were rotated in opposite directions. Again, this shutter-opening method insures that all parts of the camera lens will be given an equal length of time to transmit light rays to the film or plate.

Figure 6:
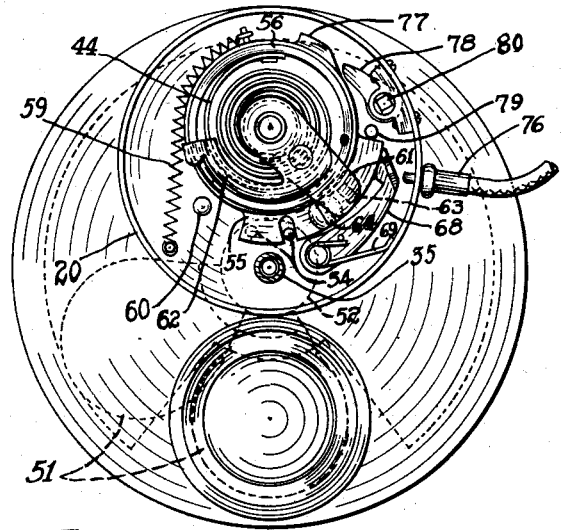
Figure 8:
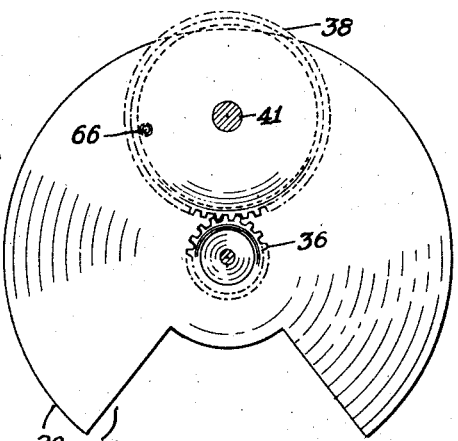
Figure 7:
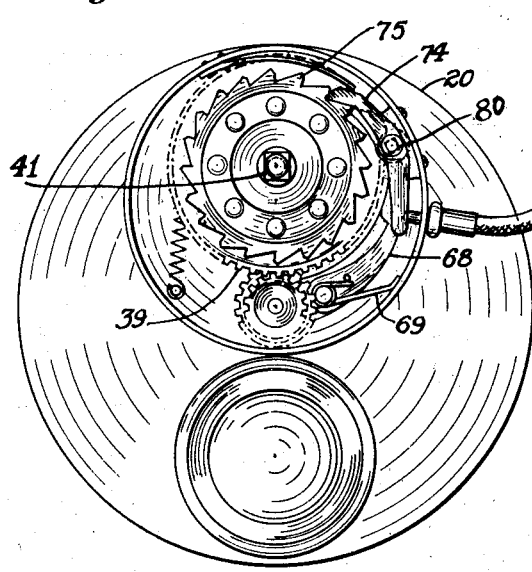
Figure 9:
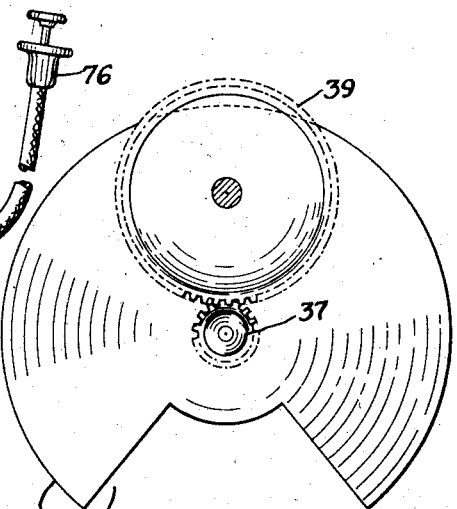
Figure 6A:
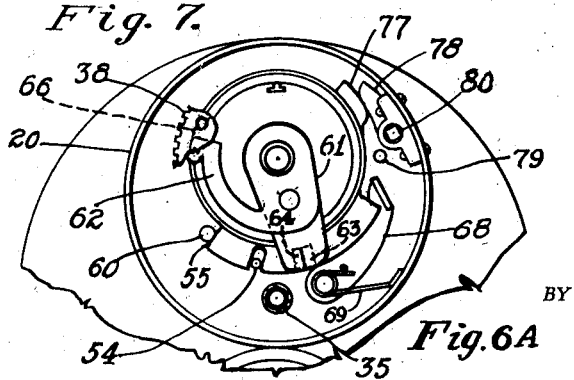
Figure 11:
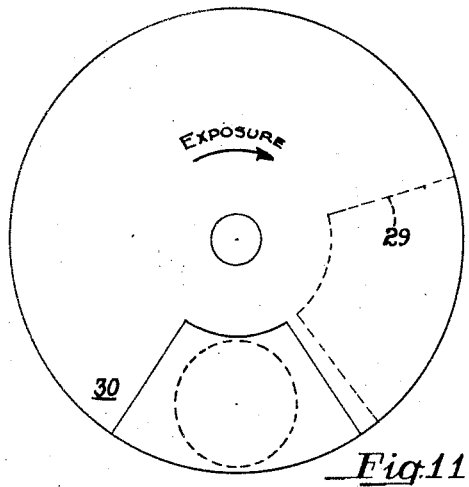
Figure 16:
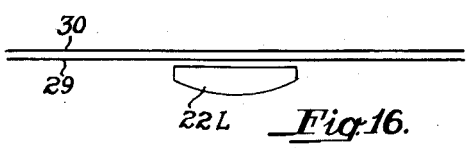
Figure 15:
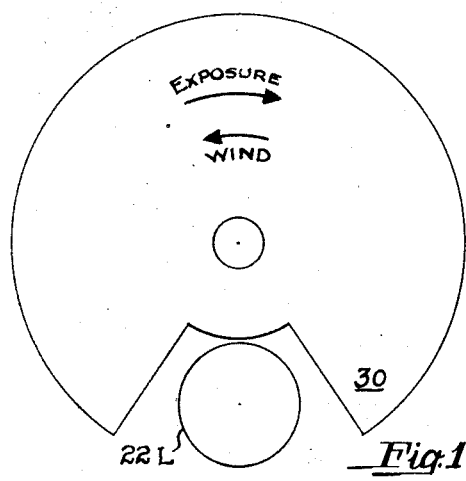

As shown in the accompanying drawings, Figure 1 is a face view of the unit; Fig. 2 is a rear view thereof; Fig. 3 is a vertical sectional view through the structure of Figs. 1 and 2; Fig. 4 is an enlarged sectional view of a portion of the structure of Fig. 1; Fig. 5 is a face view of the diaphragm disc; Fig. 6 is a face view of the unit with the front cover plate and a portion of the apparatus removed; Fig. 6—A shows some of the apparatus of Fig. 6 in other positions; Fig. 7 is a similar view showing only the cover plate removed; Fig. 8 is a face view of the front shutter disc and the operating gears therefor; Fig. 9 is a face view of the rear shutter disc and the operating gears therefor; Fig. 10 is an edge view of a portion of the apparatus of Fig. 6; Figs. 11, 12, 13, 14 and 15 schematically show the relative positions of the shutter discs at various stages of operation, and Fig. 16 is an edge view thereof.

The shutter unit may be attached to various standard types of cameras, after the manner in which other forms of shutter units are applied thereto, and comprises a casing or housing 20 of generally cylindrical form and having a tubular extension 21 with which a lens holder or barrel 22 has screw threaded connection. A front cover plate 23 is secured to the casing 20 by screws 24, and a rear plate 25 is connected thereto by screws 26. The opposed faces of the member 25 and housing wall 28 are recessed as shown in Fig. 3, to accommodate the shutter discs and their supporting elements. A lower portion of the plate 25 has a cylindrical opening with which a lens cell member 27 has threaded engagement, this member being arranged for connection to a camera box or lens board in any well known manner.

Exposures are effected through the operation of rotary shutter discs 29 and 30, an exposure taking place when their cut-outs 31 and 32, respectively, come into axial alinement with one another, between the lens barrel sections 22 and 27. When either or both of these cut-outs has passed from the lens barrel, the admission of light through the lens is shut off.

The shutter disc 29 is mounted on a tubular shaft 33 that is rotatable on a shaft 35 which is supported in bearings carried by the end walls 23 and 25. The shaft 35 carries the shutter disc 30. Gear wheels 36 and 37 are secured to the shafts 33 and 35, respectively, and are driven by gear wheels 38 and 39, respectively.

The gear wheels 38 and 39 are rigidly secured to a shaft 41 that has a handle 42 by which it is turned to place it under spring tension. A spring housing 43 is secured to the casing and has connected thereto one end of a spring 44, the other end of the spring being secured to a bushing 40 on the shaft 41, so that counterclockwise turning of the shaft 41 by its handle 42 and the bushing 40, as hereinafter explained, will place the spring under tension that will rotate the shaft and the gear wheels when the spring is permitted to expand or unwind. This rotation of the gear wheels imparts rotative movement to the shutter members 29—30.

The gear wheels 38—39 turn as a unit, but since the gear wheels 39 and 37 may be 100 teeth and 20 teeth, respectively, and the gear wheels 38 and 36 may have 96 teeth and 24 teeth respectively, the disc 29 will be given four revolutions during each revolution of the shaft 41, while the disc 30 will revolve five times. Various other gear ratios can obviously be employed, it being necessary only that the spaces 31 and 32 in the discs come into alinement with one other, in the lens barrel, at a predetermined stage in each revolution of the shaft 41, to thus provide for the making of an exposure.

Since one disc moves faster than the other, the duration of even partial light opening is less than the time required for the space 31 in the disc 29 to pass the lens, since the space 32 in the disc 30 has, in effect, caught up with the slower moving space 31, in the lens barrel, and immediately begins to shut off the light so that before the space 31 has entirely passed from the lens barrel, the disc 30 will have cut off the light. This, together with the fact that the discs can be rotated a plurality of revolutions for each exposure, and thus acquire a high speed, enables the making of exposures in a shorter time than one-thousandth of a second. This has been proved by a shutter made according to this invention, and operated for a number of months.

A diaphragm disc 45 is secured to a hub 46 that is journaled in the wall 25 and is provided with a plurality of "stop" openings 47 (six being shown in Fig. 5). A setting arm 48 is secured to the hub and has on its inner surface a protuberance that will snap into depressions 49 in the plate 25, which are located at such points relative to the openings 47 that the diaphragm will be yieldably latched when a desired stop opening is brought into axial alinement with the lens barrel, through turning of the arm 48 by the operator.

A safety shield 51 is carried by a hub 52 that is loosely supported for swinging movement in a sleeve 53 secured in the housing 20, the shield being shown in Fig. 3 in its closed position, to shut off passage of light through the lens barrel, when the shutter is being turned and tensioned to make an exposure. A stud 54 is carried by the hub 52 and extends through an arcuate slot in the inner wall 28 of the housing 20. The stud 54 extends into a notch in a flange 55 on a collar 56 (Fig. 6) that lies in a space 57 (Fig. 3) and loosely fits around an annular flange 58 formed on the wall 28 of the casing. A spring 59, connected at its ends to the collar 56 and to the housing wall 28, biases the collar 56 in a counterclockwise direction against a stop 79 and thus yieldably holds the safety shield 51 open. A stop 60 limits swinging movement of the collar in the opposite direction.

As above stated, one end of the power spring 44 is connected to the bushing 40 that loosely surrounds the shaft 41. The bushing has an arm 61 rigid therewith that in turn has riveted thereto a leaf 62 of resilient metal. A stud 63 on the arm 61 (Figs. 6 and 10) is engageable with a stud 64 on the flange 55, for the purpose of actuating the collar 56, as hereinafter explained.

Also, a stud 66 is located in a recess in the gear wheel 38, in position to abut against the free end of the flange 62 when the shaft 41 is turned in a counterclockwise direction, to thereby rotate the bushing 40 and place the power spring 44 under tension. In winding the power spring, the stud 66 will be brought into engagement with the free end of leaf or arm extension 62 thus swinging the arm 61 counterclockwise, to begin tensioning of the power spring. At the beginning of this tensioning movement, the openings 31 and 32 will have passed one another in the lens barrel, and will not again be brought into registry therein during a complete winding of the power spring. Further movement of the arm 61 will cause it to trip a latch 68 against a spring 69, to release the flange 55 and permit the spring 59 to swing the shield 51 out of the lens barrel.

The shaft 41 carries a pointer 71 that moves with the handle 42, on a dial 72. At the point T on the dial, the openings in the shutter blades are in registry. The successive steps numbered 1 to 18 in the annular row of the dial figures represent the degrees of spring tension. Thus at 2 on the scale, the tension will be low and the shutters, upon release of the tension, will not turn very far nor acquire much momentum by the time the shutter openings come into registry in the lens barrel since the distance traveled is from 2 to T. On the other hand, if the handle is given a substantially complete rotation until the pointer 71 reached 17 or 18 on the dial, the shutters will turn several revolutions and acquire great momentum during the expansion of the power spring approximately its highest tensioned position.

When the handle 42 has been turned the proper distance for a desired spring tension, a latch 74 on a shaft 80 will engage teeth in a ratchet wheel 75 that is secured to the shaft 41. A cable release 76 is provided for tripping the latch. The release of the ratchet wheel 75 permits the arm 61, through its leaf extension 62, to push the stud 66 and the gear wheels 38—39 in a clockwise direction to rotate the shutter blades 29—30 so as to bring their openings into registry in the lens barrel.

Figure 12:
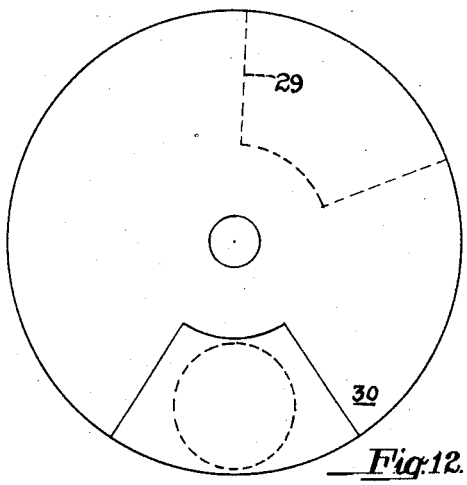
Figure 13:
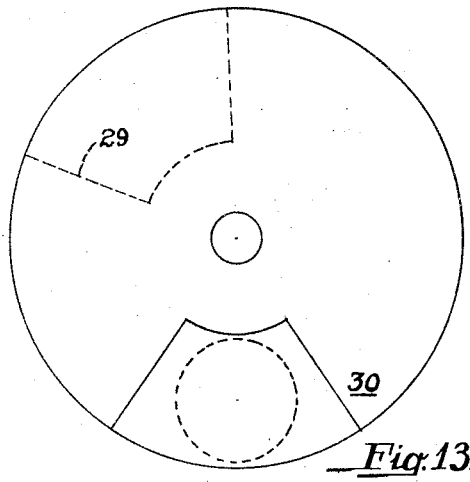
Figure 14:
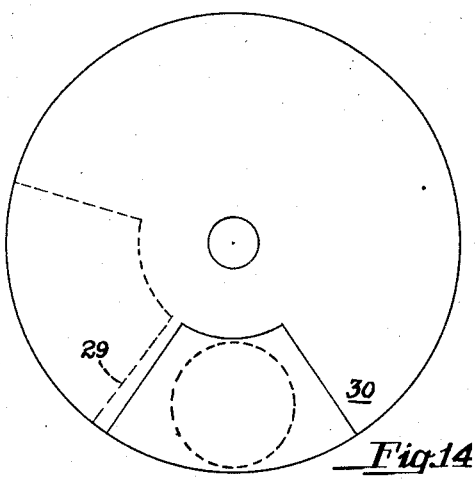

The relative movements of the shutter discs is schematically shown in Figs. 11 to 15, looking forwardly from the rear of the camera. When the power spring has been wound to such tension that the pointer 71 is at 16 on the dial 72, the shutter discs 29—30 will be in the positions shown in Fig. 11. Release of the latch 74 causes both discs to be rotated under nearly full spring tension. As shown in Figs. 12, 13, and 14, the shutter openings will travel past the exposure aperture at different times. When the disc 30 has made 4 revolutions and the disc 29 rotated three and one-fifth revolutions, their openings will come into registry at the exposure aperture and the lens 22L (Fig. 15), at which time the pointer 71 will have reached T on the dial.

For a slightly slower shutter speed, the power spring may be wound until the pointer reaches the point 12 on the dial. The shutter discs will then be in the position of Fig. 12. From this setting, the disc 30 will be driven 3 revolutions and the disc 29 driven two and two-fifths revolutions before coming into registry for an exposure, as in Fig. 15.

From point 8 on the dial (Fig. 13) the disc 30 will have 2 revolutions and the disc 29 one and three-fifths revolutions to their exposure positions, while from a setting and tensioning at 4 on the dial (Fig. 14) the disc 30 will be given a travel of 1 revolution and the disc 29 a travel of four-fifths of a revolution, to their exposure position. The distances of rotative travel by each disc will, of course, be proportionately greater or less at the various other tensioned positions indicated on the dial 72.

As above indicated, the shutter discs may be given several revolutions or even only a partial revolution before coming into registry, depending upon their setting and the degree of spring tension as indicated by the pointer 71. During this rotation of the arm 61, its stud 63 will be brought into engagement with the stud 64 as shown in Fig. 10, thus swinging the collar 56 in a clockwise direction to move the shield 51 to its lowermost or operative position, so that continued rotation of the shutter members will not admit light through the lens barrel. The shield will be held in this position by the latch 68 until released as above explained.

This turning of the collar 56 brings a camming lug 77 thereon into engagement with a finger 78 that is secured to the shaft 80 so as to rock the shaft and hold the pawl 74 away from the ratchet wheel 75 in case the operator has removed his fingers from the cable release. This permits free rotation of the shutter discs 29—30 under the momentum given to them by the power spring, after they have passed exposure position. During this continued movement of the shutter, the stud 66 on the gear wheel will move along the extension 62, in a clockwise direction, the free end of the extension yielding to allow the stud to pass. This provision for continued free movement of the shutter members and the gear wheels is of importance in that they can continue to rotate idly, after exposure, thus avoiding shocks to the mechanism that would occur if they moved against fixed stops while still being subject to momentum imparted thereto by the power spring. Thus, if the power spring is given its full tension by one revolution of the winding key 42, in unwinding, the shaft 41 will continue to rotate freely for perhaps 30 revolutions while the shutter discs 29—30 will rotate for 120 and 150 revolutions, respectively.

For succeeding pictures, the operation above described will be repeated. That is to say, the shaft 41 will be turned counterclockwise to swing the arm 61 to place it under tension and at the same time opening the latch 68 and swinging the collar 56 to move the shield out of the lens barrel and remove the cam surface 77 from beneath the fingers 78 so that the pawl 74 can operate against the ratchet wheel 75. Winding movement of the shaft 41 is limited to substantially a single rotation, by a stud 79 in the casing being engaged by the upper end of the flange 55, the stud 63 on the arm 61 having at this time moved in behind the stud 64 on the flange 55.

An outer row of numerals in the lower portion of the dial 72 is provided for use with a movable switch arm 81. This switch arm is grounded to the casing and turns with the shaft 41, and during an exposure operation is brought into engagement with a stationary switch contact member 82 that is insulated from the casing and is connected to a conductor 83 which, together with a conductor 84 that is grounded to the camera casing, forms a part of an electrical circuit through a flash lamp (not shown) so that a flash light illumination can be had in proper synchronism with the exposure. The switch arm 81 is frictionally held in rotatably adjusted positions with respect to the handle 42 (Fig. 3), between the handle and a washer 85, by a clamping nut 86. The handle 42 has a squared opening engageable with a squared portion on the shank of the shaft 41, but the arm 81 is rotatably adjustable on the shaft.

It is necessary that the circuit through the flash lamp bulb is completed by the switch arm at about one-fiftieth of a second before the pointer 71 reaches T on the dial (at which time the shutter is opened for exposure). Since the rate at which the pointer and the shutter turn depends upon the degree of tension in the power spring 44, the switch arm 81 has to be adjusted differently for low spring tensions than for higher tensions. For example, if the pointer 71 is set at 4 on the dial, with consequent minor tensioning of the power spring, the switch arm will be set so that it will complete the circuit $\frac{1}{50}$ second before the pointer reaches T. At all tensions below 19 on the pointer scale, the switch arm 81 will be set farther back or in a more retracted position relative to the pointer, because the pointer travels under less tension than where it is set at 18 (full tension), for example. In the latter case, the switch arm 81 will actually be set in advance of the pointer 71 so that it will complete the lamp circuit sufficiently far in advance of the shutter opening when the pointer reaches T. For lesser degrees of tensioning, the switch arm 81 will, of course, be set farther back (counterclockwise) relative to the pointer.

The scale represented by the outer row of numerals will be varied to suit various types and strength of power springs, by changing the numerals to indicate the required setting of the switch arm for proper synchronism or timing of the flash.

I claim as my invention:

1. Shutter apparatus for use in conjunction with the exposure aperture of a camera, comprising a pair of rotatably mounted shutter blades movable across said aperture and having openings therethrough positioned to pass the aperture and to permit the passage of light through the said aperture, when the openings are brought into alinement with one another at the aperture, a stationary spring housing, a coil spring therein having its outer end connected to the housing, a rotatable shaft-driving bushing connected to the inner end of the spring, a shaft extending loosely into the bushing, a pair of gear wheels secured to the shaft, an arm rigidly secured to the bushing, a stud on one of the gear wheels, positioned to be engaged by an abutment surface on the arm, during rotation of the bushing through expansion of the spring, whereby the gear wheels will be rotated, means rendering the stud and said abutment surface ineffective to prevent continued rotation of the gear wheels independently of the bushing, after the spring has moved a distance to effect an exposure, and a driving connection between each of said gear wheels and one of the shutter blades.

2. Shutter apparatus for use in conjunction with the exposure aperture of a camera, comprising a pair of rotatably mounted shutter blades movable across said aperture and having openings therethrough positioned to pass the aperture and to permit the passage of light through the said aperture, when the openings are brought into alinement with one another at the aperture, a stationary spring housing, a coil spring therein having its outer end connected to the housing, a rotatable shaft-driving bushing connected to the inner end of the spring, a shaft extending loosely into the bushing, a pair of gear wheels secured to the shaft, an arm rigidly secured to the bushing, a stud on one of the gear wheels, positioned to be engaged by an abutment surface on the arm, during rotation of the bushing through expansion of the spring, whereby the gear wheels will be rotated, means rendering the stud and said abutment surface ineffective to prevent continued rotation of the gear wheels independently of the arm and the bushing, after the spring has moved a distance to effect an exposure, a driving connection between each of said gear wheels and one of the shutter blades, a ratchet wheel secured to the shaft, a pawl for releasably holding the ratchet wheel when the shaft has been turned in a direction to bring the said stud against said abutment surface, to turn the bushing and place the spring under tension, means for tripping the pawl, and means automatically operable after tripping of the pawl, to hold it away from the ratchet wheel while the wheels are rotating under the influence of the spring.

3. Shutter apparatus for use in conjunction with the exposure aperture of a camera, comprising a pair of rotatably mounted shutter blades movable across said aperture and having openings therethrough positioned to pass the aperture and to permit the passage of light through the said aperture, when the openings are brought into alinement with one another, at the aperture, a stationary spring housing, a coil spring therein having its outer end connected to the housing, a rotatable shaft-driving bushing connected to the inner end of the spring, a shaft extending loosely into the bushing, a pair of gear wheels secured to the shaft, an arm rigidly secured to the bushing, a stud on one of the gear wheels, positioned to be engaged by an abutment surface on the arm, during rotation of the bushing through expansion of the spring, whereby the gear wheels will be rotated, means rendering the stud and said abutment surface ineffective to prevent continued rotation of the gear wheels independently of the arm and the bushing, after the spring has moved a distance to effect an exposure, and a driving connection between each of said gear wheels and one of the shutter blades, also automatically operable to return the pawl to its operative position, during turning of the shaft in a direction to place the spring under tension.

4. Shutter apparatus for use in conjunction with the exposure aperture of a camera, comprising a pair of rotatably mounted shutter blades movable across said aperture and having openings therethrough positioned to pass the aperture and to permit the passage of light through the said aperture, when the openings are brought into alinement with one another at the aperture, a stationary spring housing, a coil spring therein having its outer end connected to the housing, a rotatable shaft-driving bushing connected to the inner end of the spring, a shaft-extending loosely into the bushing, a pair of gear wheels secured to the shaft, an arm rigidly secured to the bushing, a stud on one of the gear wheels, positioned to be engaged by an abutment surface on the arm, during rotation of the bushing through expansion of the spring, whereby the gear wheels will be rotated, means rendering the stud and said abutment surface ineffective to prevent continued rotation of the gear wheels independently of the arm and the bushing, after the spring has moved a distance to effect an exposure, a driving connection between each of said gear wheels and one of the shutter blades, a light shield movable into the aperture, and means controlled by the said arm to move the shield into and out of the aperture.

5. Shutter apparatus for use in conjunction with the exposure aperture of a camera, comprising a pair of rotatably mounted shutter blades movable across said aperture and having openings therethrough positioned to pass the aperture and to permit the passage of light through the said aperture, when the openings are brought into alinement with one another at the aperture, a stationary spring housing, a coil spring therein having its outer end connected to the housing, a rotatable shaft-driving bushing connected to the inner end of the spring, a shaft-extending loosely into the bushing, a pair of gear wheels secured to the shaft, an arm rigidly secured to the bushing, a stud on one of the gear wheels, positioned to be engaged by an abutment surface on the arm, during rotation of the bushing through expansion of the spring, whereby the gear wheels will be rotated, means rendering the stud and said abutment surface ineffective to prevent continued rotation of the gear wheels independently of the arm and the bushing, after the spring has moved a distance to effect an exposure, a driving connection between each of said gear wheels and one of the shutter blades, a light shield movable into and out of the aperture, a spring normally holding the shield out of the aperture, means on the arm for moving the light shield into the aperture during further movement of the arm when the shutter blades have passed exposure position, and means controlled by movement of the arm during tensioning of the spring preliminary to an exposure, for moving the shield out of the aperture.

6. Shutter apparatus for use in conjunction with the exposure aperture of a camera, comprising a rotatable shutter element movable across the aperture, to control the passage of light therethrough, a stationary spring housing having a coil spring therein with one end connected to the housing, a rotatable driving element in the housing, connected to the other end of the spring and to the shutter element, and so arranged that the shutter element will be rotated thereby, through the exertion of spring tension on the driving element, a collar loosely surrounding the housing, a light shield movable by the collar into the aperture, a tension spring connected to the collar and to a fixed point, to yieldably hold the shield away from the aperture, means movable with the driving element for moving the collar and the shield in opposition to said spring, a latch for holding the shield closed, and an arm carried by the driving element in position to trip the latch during movement of the shutter element in opposition to the first-named spring to place the shutter under tension.

7. Shutter apparatus for use in conjunction with the exposure aperture of a camera, comprising a rotatable shutter element movable across the aperture, to control the passage of light therethrough, a stationary spring housing having a coil spring therein with one end connected to the housing, a rotatable driving element in the housing, connected to the other end of the spring and to the shutter element, and so arranged that the shutter element will be rotated thereby, through the exertion of spring tension on driving element, a collar loosely surrounding the housing, a light shield movable by the collar into the aperture, a tension spring connected to the collar at a fixed point, to yieldably hold the shield away from the aperture, a latch for holding the shield in the aperture, an arm carried by the driving element in position to trip the latch during movement of the driving element in opposition to the first-named spring to place the shutter under tension, and means on the said arm positioned to move the shield into the aperture, after the driving element has been moved a sufficient distance to effect an exposure.

8. Shutter apparatus for use in conjunction with the exposure aperture of a camera, comprising a rotatable shutter element movable across the aperture, to control the passage of light therethrough, a stationary spring housing having a coil spring therein with one end connected to the housing, a rotatable driving element in the housing, connected to the other end of the spring and to the shutter element, and so arranged that the shutter element will be rotated thereby, through the exertion of spring tension on the driving element, a collar loosely surrounding the housing, a light shield movable by the collar into the aperture, a tension spring connected to the collar at a fixed point, to yieldably hold the shield away from the aperture, a latch for holding the shield in the aperture, an arm carried by the driving element in position to trip the latch during movement of the driving element in opposition to the first-named spring to place the shutter under tension, means on the said arm positioned to move the shield into the aperture, after the driving element has been moved a sufficient distance to effect an exposure, a pawl for releasably holding the driving element in tensioned positions, means on the collar for holding the pawl open after it has been tripped and the arm has moved the collar to a position at which the shield has been moved into the aperture, and means rendering the arm rotatable in its spring-driven direction, independently of the said driving element.

THOMAS McG. AIKEN.

REFERENCES CITED

The following references are of record in the file of this patent:

UNITED STATES PATENTS

| Number | Name | Date |
|---|---|---|
| 438,943 | Perry | Oct. 21, 1890 |
| 1,239,025 | Marks | Sept. 4, 1917 |
| 2,021,765 | Billing | Nov. 19, 1935 |
| 2,187,128 | Kitroser | Jan. 16, 1940 |
| 2,188,065 | Steiner | Jan. 25, 1940 |
| 2,233,390 | Kende et al. | Feb. 25, 1941 |
| 2,278,173 | Goering | Mar. 31, 1942 |
| 2,290,362 | Springer | July 21, 1942 |
| 2,308,725 | Steiner | Jan. 19, 1943 |
| 2,350,355 | Hoffman | June 6, 1944 |
| 2,383,381 | Hammond | Aug. 21, 1945 |
| 2,384,639 | Riddell | Sept. 11, 1945 |
| 2,391,377 | Aiken | Dec. 25, 1945 |

FOREIGN PATENTS

| Number | Country | Date |
|---|---|---|
| 524,231 | France | May 10, 1921 |
| 552,545 | France | Jan. 24, 1923 |